United States Patent
Daniher et al.

(10) Patent No.: US 6,335,047 B1
(45) Date of Patent: Jan. 1, 2002

(54) EPOXYDECENAL ISOMERS

(75) Inventors: Andrew Daniher; Stefan Furrer, both of Cincinnati, OH (US); Andreas Goeke, Dubendorf (CH)

(73) Assignee: Givaudan SA (CH)

( * ) Notice: Subject to any disclaimer, the term of this patent is extended or adjusted under 35 U.S.C. 154(b) by 0 days.

(21) Appl. No.: 09/706,993

(22) Filed: Nov. 6, 2000

(51) Int. Cl.$^7$ ................................................. A23L 1/22
(52) U.S. Cl. ........................ 426/534; 426/533; 426/650
(58) Field of Search .......................... 426/89, 546, 534, 426/533, 650; 560/353

(56) References Cited

PUBLICATIONS

Alaiz, M., et al., Comparative Antioxidant Activity of Maillard– and Oxidized Lipid–Damaged Bovine Serum Albumin, J. Agric. Food Chem., 45, 3250–3254 (1997).

Buttery, R.G. and Ling, L.C., Additional Studies on Flavor Components of Corn Tortilla Chips, J. Agric. Food Chem., 46, 2764–2769 (1998).

Chang, S., et al., Regio– and Enantioselective Catalytic Epoxidation of Conjugated Polyenes: Formal Synthesis of LTA4 Methyl Ester, J. Org. Chem, vol. 58, No. 25, pp. 1639–1641 (1993).

Gassenmeier, K. and Schieberle, P., Formation of the Intense Flavor Compound trans–4–5–epoxy–(E)–2–Decenal in Thermally Treated Fats, JAOCS, vol. 71, No. 12 (Dec. 1994).

Guth, M. and Grosch, W., Determination of Soya–bean Oil: Quantification of Primary Flavour Compounds Using a Stable Isotope Dilution Assay, Lebensm–Wiss. u.–Technol., 23, 513–522 (1990).

Hinterholzer, A. and Schieberle, P., Identification of the Most Odour–active Volatiles in Fresh, Hand–extracted Juice of Valencia Late Oranges by Odour Dilution Techniques, Flavour and Fragrance Journal, vol. 13, pp. 49–55 (1998).

Lee, N.H. and Jacobsen, E.N., Enantioselective Epoxidation of Conjugated Dienes and Enynes. Trans–Epoxides from Cis–Olefins, Tetrahedron Letters, vol. 32, No. 45, pp. 6533–6536 (1991).

Lin, J., et al., Synthesis of trans–4,5–Epoxy–(E)–2–decenal and Its Deuterated Analog Used for the Development of a Sensitive and Selective Quantification Method Based on Isotope Dilution Assay with Negative Chemical Ionization, Lipids, vol. 34, No. 10, pp. 1117–1126 (1999).

Ong, P.K.C., et al., Characterization of Volatiles in Rambutan Fruit (Nephelium lappaceum L.), J. Agric. Food Chem., 46, 611–615 (1998).

Reiners, J. and Grosch, W., Odorants of Virgin Olive Oils with Different Flavor Profiles, J. Agric. Food Chem, vol. 46, 2754–2763 (1998).

Schieberle, P. and Grosch, W., Potent odorants of the wheat bread crumb: Differences to the crust and effect of a longer dough fermentation, Z Lebensm Unters Forsch, 192:130–135 (1991).

Wagner, R.K. and Grosch, W., Key Odorants of French Fries, JAOCS, vol. 75, No. 10, pp. 1385–1392 (1998).

Zamboni, R., et al., The Stereospecific Synthesis of 14S, 15S–Oxido 5Z, 8Z, 10E, 12E–Eicosatetraenoic Acid, Tetrahedron Letters, vol. 24, No. 45, pp. 4899–4902 (1983).

Zhang, W. and Jacobsen, E.N., Asymmetric Olefin Epoxidation with Sodium Hypochlorite Catalyzed by Easily Prepared Chiral Mn(III) Salen Complexes, J. Org. Chem. 56, 2296–2298 (1991).

*Primary Examiner*—Leslie Wong
(74) *Attorney, Agent, or Firm*—Wood, Herron & Evans, L.L.

(57) ABSTRACT

A method of producing a more intense flavorant. Trans-4,5-epoxy-(E)-2-decenal is enriched to contain at least 90% of the (–) isomer and is added to a product in an amount sufficient to flavor the product. The product may be a foodstuff, such as a food or beverage. Addition of the substantially pure (–) isomeric form of trans-4,5-epoxy-(E)-2-decenal achieves enhanced product taste and/or aroma, and provides increased economy and efficiency in its production.

15 Claims, 3 Drawing Sheets

EPOXYDECENAL ISOMERS

FIELD OF THE INVENTION

The invention relates generally to epoxydecenal compounds, and specifically to isomeric forms of epoxydecenal having enhanced flavor potency.

BACKGROUND

Epoxydecenal (trans-4,5-epoxy-(E)-2-decenal) ($C_{10}H_{16}O_2$, MW 168.24) is a known flavorant for foods, beverages, or other products. It enhances the flavor and/or odor of these products, making the products more desirable to the consumer. Epoxydecenal is formed from the degradation of fats, and is found in many foodstuffs, including both foods and beverages such as barley malt, French fries, olive oil, baguettes, peanut oil, hazelnut oil, pumpkinseed oil, rambutan fruit, puff pastries, wheat bread, cooked chicken, cooked beef, cooked pork, boiled salmon, cod, anchovy, oat meal, butter, buttermilk, French beans, oranges, and others.

The synthesis of epoxydecenal has been described. The compound was prepared by homologation of the precursor aldehyde epoxide using a Wittig reaction. Epoxydecenal exists in nature as a mixture of two isomers, the (S,S) isomer (FIG. 1A) and the (R,R) isomer (FIG. 1B). The substantially pure (S,S) isomer of epoxydecenal has been synthesized, as reported by Zamboni et al., as an intermediate in the total synthesis of 14S, 15S-oxido 5Z,8Z, 10 E, 12E-eicosatetraenoic acid (*Tetrahedron Letters*, 24: 4899–4902 (1983)).

The use of a catalyst to yield enantiomerically enriched mixtures of epoxydecenal has been reported by Jacobsen et al. (Chang, Lee, and Jacobsen, *J. Org. Chem.*, 58: 6939–6941 (1993)). The report demonstrated the utility of this catalyst to perform regio- and enantioselective catalytic epoxidations, in which conjugated polyenes-cis alkenes are reacted in favor of trans alkenes. The catalytic reaction results in mainly the trans epoxide and yields a high enantiomeric enrichment. An enantiomerically enriched mixture of trans-4,5-epoxy-(E)-2-decenal was synthesized from the cis, trans-decadienol, with an enantiomeric excess (EE) of 83% (a high enantiomeric excess being desirable for resolutions and asymmetric syntheses). There was no mention or suggestion by Jacobsen et al. for using the compounds as flavors or ingredients. While the publication identified both (R,R) and (S,S) epoxydecenal isomers, it neither mentioned nor suggested the odor of the individual isomers.

Racemic mixtures of epoxydecenal have been synthesized for use as an odorant (Schieberle et al,. *Z Lebensm Unters Forsch* 192:130–135 (1991) and Lin, Jianming et al, *Lipids* (1999), 34 (10), 1117–1126. In the Schieberle report, epoxidation of decadienal with 3-chloroperbenzoic acid yielded the epoxydecenal mixtures. The compound was prepared for evaluation as an odorant in wheat bread crumbs and for comparison of gas chromatography retention times with known samples. The Lin paper synthesized epoxydecenal using a Wittig reaction as a key step. In both of these reports, there is no mention of the odor activity of the individual isomers.

Among all the reports describing the use of epoxydecenal in foodstuffs, the publication by Buttery (*J. Agric. Food Chem.*, 46: 2764–2769 (1998)), studying corn tortilla chips, mentioned the use of epoxydecenal isomers and stated that two isomers of 4,5-epoxy-(E)-2-decenal (labeled as isomer A and isomer B) were identified. Buttery et al. neither teaches nor discloses the odor or potency of the individual isomers.

Thus, a method to enhance intensity of an epoxydecenal flavorant is desirable.

SUMMARY OF THE INVENTION

The invention is directed to an epoxydecenal (trans-4,5-epoxy-(E)-2-decenal) flavorant composition having increased intensity. The composition contains epoxydecenal that has been enriched to contain at least about 90% of the (−) isomeric form. In some embodiments, the composition may contain up to about 99% of the (−) isomeric form. The composition may be used to flavor foodstuffs, such as foods and beverages, or it may be used in other products such as health care products and pharmaceuticals.

The invention is also directed to a method of flavoring a product with epoxydecenal (trans-4,5-epoxy-(E)-2-decenal). In the method, epoxydecenal (trans-4,5-epoxy-(E)-2-decenal) that has been enriched to contain at least about 90% of the (−) isomeric form is added in an amount sufficient to flavor the product. The amount may be in the range of 0.001 ppb to 10 ppm. The product may be a foodstuff.

The invention is additionally directed to an epoxydecenal flavorant having enhanced intensity. Epoxydecenal (trans-4,5-epoxy-(E)-2-decenal) containing a racemic mixture of the (−) and (+) isomers is synthesized. The enriched mixture is then separated into fractions containing the (−) and (+) isomers, and the fractions containing the (−) isomer are purified and added to a product such as a foodstuff to produce a high-impact flavor.

The composition provides an epoxydecenal (trans-4,5-epoxy-(E)-2-decenal) flavorant with enhanced intensity, permitting a lower concentration of the flavorant to achieve a desired product taste and/or aroma. This results in a more efficient and economical product. These and other embodiments and advantages of the invention will be apparent in light of the following figures and detailed description.

The invention will be further appreciated with respect to the following figures and description.

DETAILED DESCRIPTION

Figures 1A, 1B:
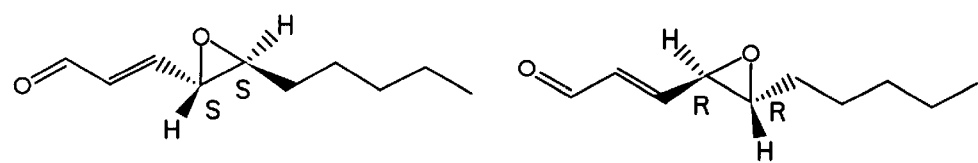
FIG. 1A shows the chemical structure of the epoxydecenal (S,S) isomer.
FIG. 1B shows the chemical structure of the epoxydecenal (R,R) isomer.

The desired taste and/or odor imparted by epoxydecenal (trans-4,5-epoxy-(E)-2-decenal) is due to the racemic mixture of its (−) and (+) isomers. It is the (−) isomer, compared to the (+) isomer, that imparts a more intense flavor and/or odor to products, such as foodstuffs. A more intense flavor and/or odor is defined as one that produces a relatively higher-impact taste and/or aroma in comparison to another flavor. Lesser amounts of the (−) form, therefore, could be used to achieve enhanced product taste and/or aroma. This would, in the long run, be more cost effective (greater activity per unit of weight), more production efficient, have broader applicability, and would result in a more desirable product taste. Due to the expense and difficulty in obtaining the substantially pure (−) isomeric form, however, racemic mixtures of epoxydecenal (trans-4,5-epoxy-(E)-2-decenal), rather than individual isomers, continue to be used to impart a desired flavor and/or odor to foods.

Thus, one embodiment of the invention is a method to achieve a substantially pure (−) isomeric form. A racemic mixture of the (−) and (+) forms of epoxydecenal (trans-4,5-epoxy-(E)-2-decenal) isomers was first synthesized, as described in the following sequence.

Synthesis of Racemic Epoxydecenal
Step 1: SYNTHESIS OF COMPOUNDS A AND A¹ Deca-trans-2-cis-4- dien-1 -ol To a 750 mL 3-neck flask under nitrogen was added 4.16 g of lithium aluminum hydride [110 mmol](0.55 eq.) [LiAlH$_4$, 37.9, Chemmetall] and 300 mL diethyl ether [Fluka, purris]. Ethyl decadienoate, 39.24 g [200 mmol] in 80 mL diethyl ether [Fluka, puriss] was added over a period of 45 min, between 33–35° C. After the addition 120 mL diethyl ether [Fluka, purris] was added. The grey suspension was stirred for 18 h (overnight) at room temperature. Water was added to the grey suspension under careful ice cooling until the grey color disappeared. The mixture was extracted twice with ether. The organic layers were washed with NaCl (saturated), dried over MgSO$_4$ and concentrated (down to 0.3 torr). From this, 30.83 g of a slightly yellow liquid (COMPOUND A) was recovered (100% yield).

An alternative synthetic route is as follows. To a 400 mL 4-neck flask under nitrogen was added 6.35 g of sodium dihydrobis (2-methoxyethoxy) aluminate [0.022 mol] (1.10 eq.) [Fluka, pract., ~3.5 M in toluene, C$_6$H$_{16}$AlNaO$_4$, 202.16] and 50 mL diethyl ether [Fluka, puriss]. Ethyl decadienoate 3.92 g [0.02 mol] in 20 mL diethylether [Fluka, puriss] were added over a period of 30 min between 25–30° C. After the addition the yellow solution was stirred for 3 h at room temperature. An additional 1.16 g of sodium dihydrobis (2-methoxyethoxy) aluminate [0.004 mol] (0.2 eq.) [Fluka, pract., ~3.5 M in toluene C$_6$H$_{16}$AlNaO$_4$, 202.161 ] in 3 mL diethyl ether [Fluka, puriss] were added over a period of 15 min. The mixture was stirred for 1.5 h at room temperature. Water was added under ice cooling and the mixture was extracted twice with ether. The organic layers were washed with NaCl (saturated), dried over MgSO$_4$ and concentrated (down to 0.3 torr). From this, 2.95 g of a slightly yellow liquid (COMPOUND A¹) was recovered (96% yield).

Step 2: SYNTHESIS OF COMPOUND B Acetic acid deca-trans-2-cis-4-dienyl-ester

To a 500 mL 3-neck flask under nitrogen was added 15.43 g of COMPOUNDS A or A¹ [100.0 mmol], 50 mL of pyridine [Fluka, puriss, C$_5$H$_5$N, 79.10] and 20.42 g of acetic anhydride [200.0 mmol] (2 eq.) [Fluka, puriss, C$_4$H$_6$O$_3$, 102.86] were added. The mixture was stirred at room temperature for 3 h. The mixture was poured on ice, acidified with HCl (concentrated), and extracted twice with ether. The organic layers were washed with NaHCO$_3$ (saturated), dried over MgSO$_4$ and concentrated (to 0.3 torr). From this, 19.6 g of a yellow liquid (COMPOUND B) was recovered (100% yield).

STEP 2: synthesis of compound B

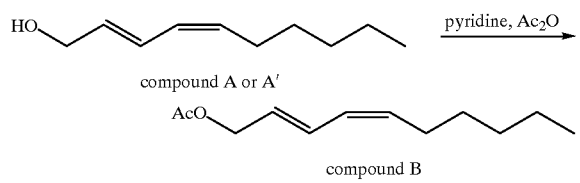

Step 3: SYNTHESIS OF COMPOUND C (−)-Acetic acid 3-(3-pentyl-trans-oxiranyl)-allyl ester As reported in *J. Org. Chem.* 58:6939 (1993) and *J. Org. Chem.* 56:2296 (1991), to a 1000 mL flask with a magnetic stir bar was added 9.50 g of COMPOUND B [48.40 mmol], 300 mL of ethyl acetate [Fluka, puriss] and 1.23 g of 4,4-Jacobsen Catalyst [R,R)-(−)-N,N'-bis(3,5-1-tert-butylsalicyclidene)-1, 2-cyclohexanediamino-manganese (III) chloride} [1.9360 mmol] (0.04 eq.) [Fluka, C$_{36}$H$_{52}$ClMnN$_2$O$_2$, 635.22] were added. After cooling in an ice bath 352 mL of NaOCl buffer [0.55 M, pH 11.3 ] 10 mL Na$_2$HPO$_4$ (0.05 M), 10.6 g NaOCl (12–15% in water) diluted to 25 mL and adjusted to pH 11.3 [193.06 mmol] (4.0 eq.) were added. The black mixture was stirred for 7 h at 0° C. and 13.5 h at room temperature. The mixture was extracted twice with ethyl acetate. The organic layers were washed with NaCl (saturated), dried over MgSO$_4$ and concentrated. The brown liquid was filtered through triethyl amine deactivated silica gel with ether/hexane (10/90). During the filtration through silica it is important to separate the catalyst from the product. The catalyst should not be carried to the next step and, furthermore, the catalyst may be recycled for economic reasons. It is also possible to use 4-phenyl pyridine-N-oxide as a co-catalyst (0.20 eq) and, when used, slightly better EEs and trans epoxide to cis epoxide ratios were obtained. The filtrate was concentrated STEP 1: synthesis of compound A or compound A'

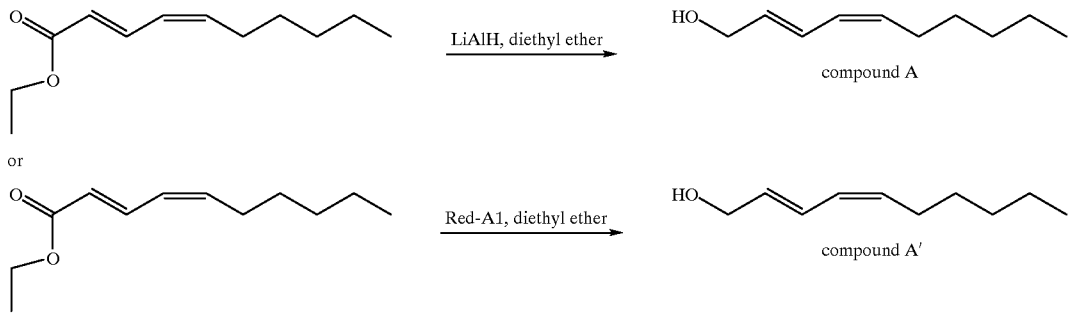

(down to 0.3 torr) and, from this, 10.83 g of a brown liquid was recovered (some of the catalyst remained in this liquid). The catalyst which remained on the column was washed off with ether and crystallized in ether/hexane, with 0.12 g dark brown crystals recovered.

STEP 3: synthesis of compound C

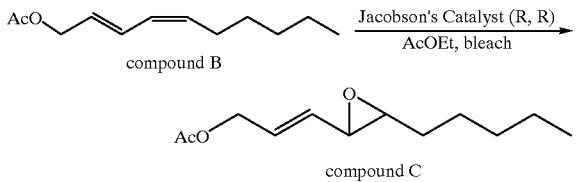

Step 4: SYNTHESIS OF COMPOUNDS D AND E 3-(3-Pentyl-trans-oxiranyl)-prop-2-en-1-ol and (−)-trans-4.5-Epoxydec-2-enal As reported in *J. Org. Chem.* 58:6939 (1993) and *J. Org. Chem.* 56:2296 (1991), to a 500 mL flask with a magnetic stir bar was added 10.5 g of COMPOUND C [48.40 mmol], 100 mL of methanol [Riedel de Haen, dried] and 242 mL of a methanoic ammonia solution [484 mmol] (10 eq.) [Aldrich, 2 M in methanol] under cooling. The mixture was stirred at room temperature for 20 h. The mixture was concentrated at room temperature to yield COMPOUND D, which was used directly for the oxidation. To the oil in the 500 mL flask was added under nitrogen 300 mL of tetrahydrofuran [Fluka, absolute, over molecular sieve] and 24.98 g of manganese (IV) oxide [286.4 mmol] (6.4 eq.) [Merck, precipitated active for synthesis, vacuum over dried, $MnO_2$, 86.94] was added. The mixture was stirred at room temperature for 80 h. The mixture was filtered through triethyl amine deactivated silica gel (hexane/ether, 90/10). During the filtration through silica it is important to separate the starting material from the product for a successful distillation. The fractions containing the product were concentrated and distilled twice to give 2 g of the product (COMPOUND E) as a light yellow oil (26.6% yield over the last two steps).

inhibit the other. For example, the (+) isomer of carvone is the main component of caraway oil, and the (−) isomer occurs in spearmint oil. In pharmaceuticals, one chirally pure compound may have fewer unwanted side-effects and greater activity, allowing for lower dosages.

Figure 2:
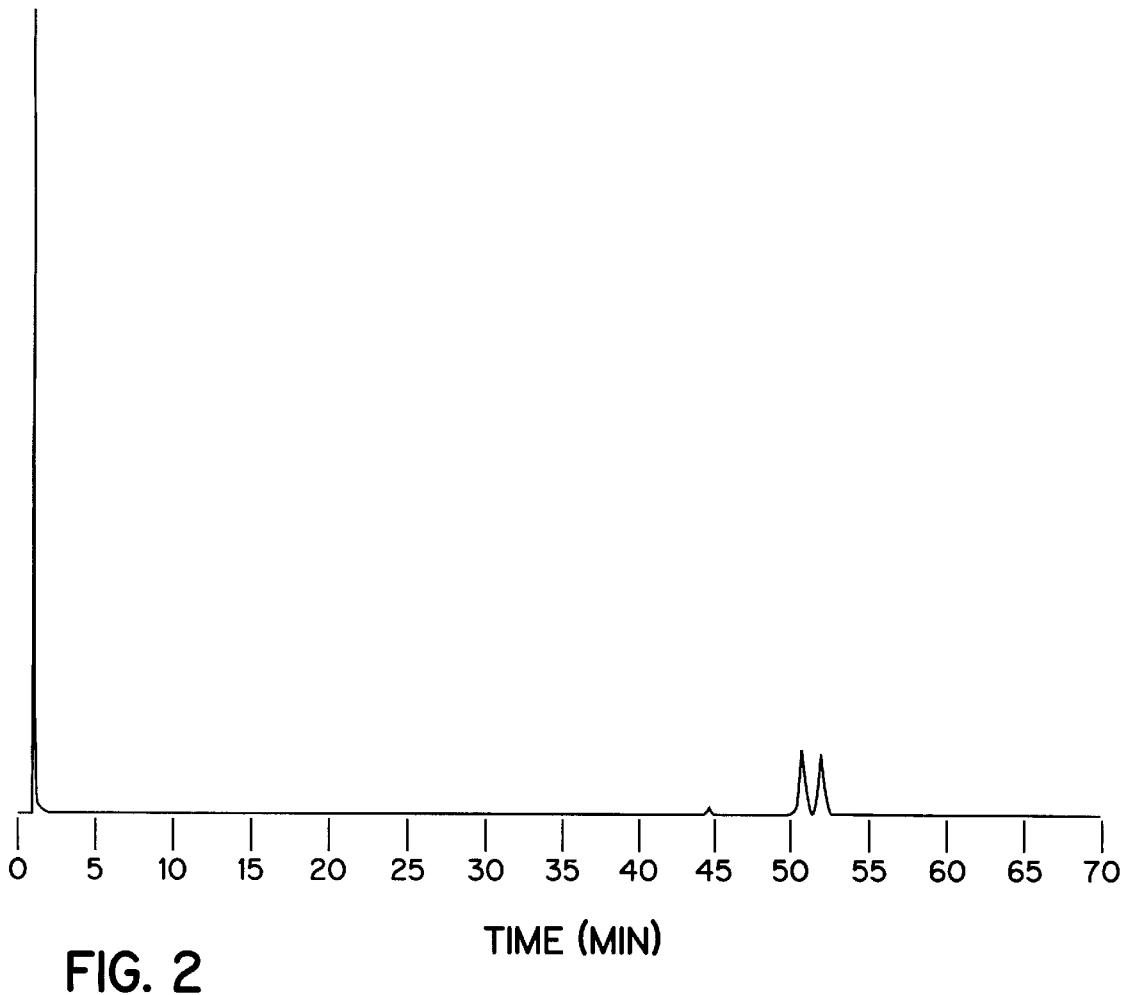
FIG. 2 shows a chromatogram of racemic epoxydecenal separated by gas chromatography (GC) using a chiral column.

The isomers were separated from the racemate by gas chromatography (GC) on a Hydrodex-b-3P 25 m×0.25 mm chiral column using a 110° C. isotherm, with 60 kPa $H_2$ as a carrier gas and a 1:50 split. As shown in FIG. 2, two peaks were obtained. The first peak had a retention time of 50.683 min and was present at a concentration of 50.989%. The second peak had a retention time of 51.923 min and was present at a concentration of 49.011%.

The GC apparatus was equipped with a port to allow access to the odor from particular column fractions ("sniff port"). Sensory analysis from each of the individual isomers was analyzed by trained flavor scientists. By separating the two isomers and evaluating the odor of each, it was determined that one of the isomers, the (−) isomer, had a more intense odor and was the dominant contributor to the overall odor of the mixture. The result of sensory evaluation of epoxydecenal isomers in water by one flavorist is as follows:

| Isomer | Concentration (parts per billion) | Odor/Taste | Rating |
|---|---|---|---|
| (+/−) | 0.02 | no smell, very faint metallic taste | medium |
| | 0.2 | clear metallic smell and taste | |
| | 20.0 | strong metallic and green bean taste | |
| (+) | 0.02 | no smell, no taste | weakest |
| | 0.2 | mild metallic smell and taste | |
| | 20.0 | clear metallic and bean taste/smell | |
| (−) | 0.02 | faint smell, mild metallic taste | strongest |
| | 0.2 | strong metallic smell/taste | |
| | 20.0 | strong metallic and bean taste/smell | |

The profile in all the samples is similar, with the (−) isomer at least 3–5 times stronger than the (+/−) racemate, or 10 times stronger than the (+) isomer.

Each of the individual isomers was also synthesized as enantiomerically enriched mixtures. The synthetic scheme STEP 4: synthesis of compound C

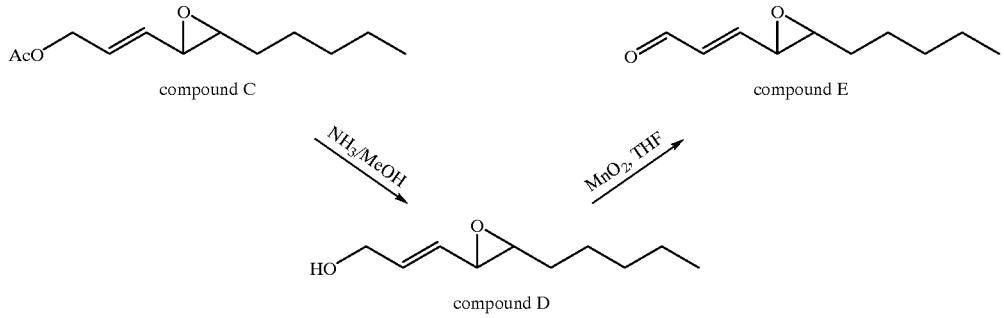

Separation and Potency Evaluation of Epoxydecenal (trans-4,5-epoxy-(E)-2-decenal) Isomers Chiral chemistry is based on the phenomenon of isomerism, in which two compounds may have the same composition but the arrangement of the atoms is different, resulting in molecular structures, termed enantiomers, that are mirror images of one another. Frequently, one isomer exhibits a different activity than the other and may even shown in FIG. 3 was followed, using Jacobsen's epoxidation catalyst. The (R,R) catalyst yielded an enantiomeric excess (EE) of 83.2%. The (S,S) catalyst yielded an EE of 84.3%. Each enriched isomer was then analyzed, using the same chiral GC column and conditions as previously described for the mixture. The results are shown in FIG. 4 and FIG. 5.

Figure 4:
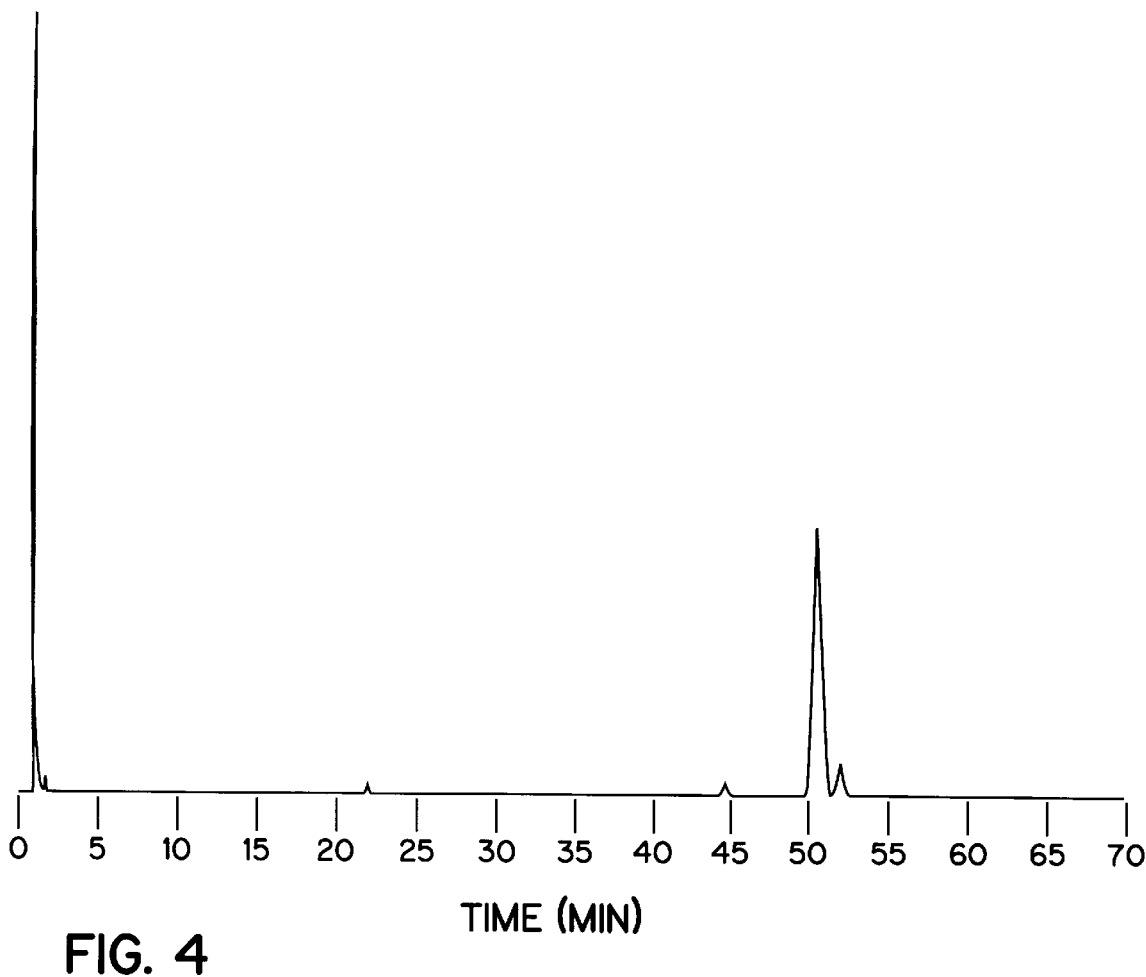
FIG. 4 shows a chromatogram of epoxydecenal synthesized using an (S,S) catalyst and separated by GC using a chiral column.

With reference to FIG. 4, the GC separation is shown using a chiral column to which the isomer synthesized using the (S,S) catalyst was applied. The major peak, having a relative concentration of 86.656%, had a retention time of 50.603 min. This closely corresponded to the first peak in FIG. 2 which had a retention time of 50.683 min. Thus, the first peak in FIG. 2 was tentatively identified as the (+) isomer.

Figure 5:
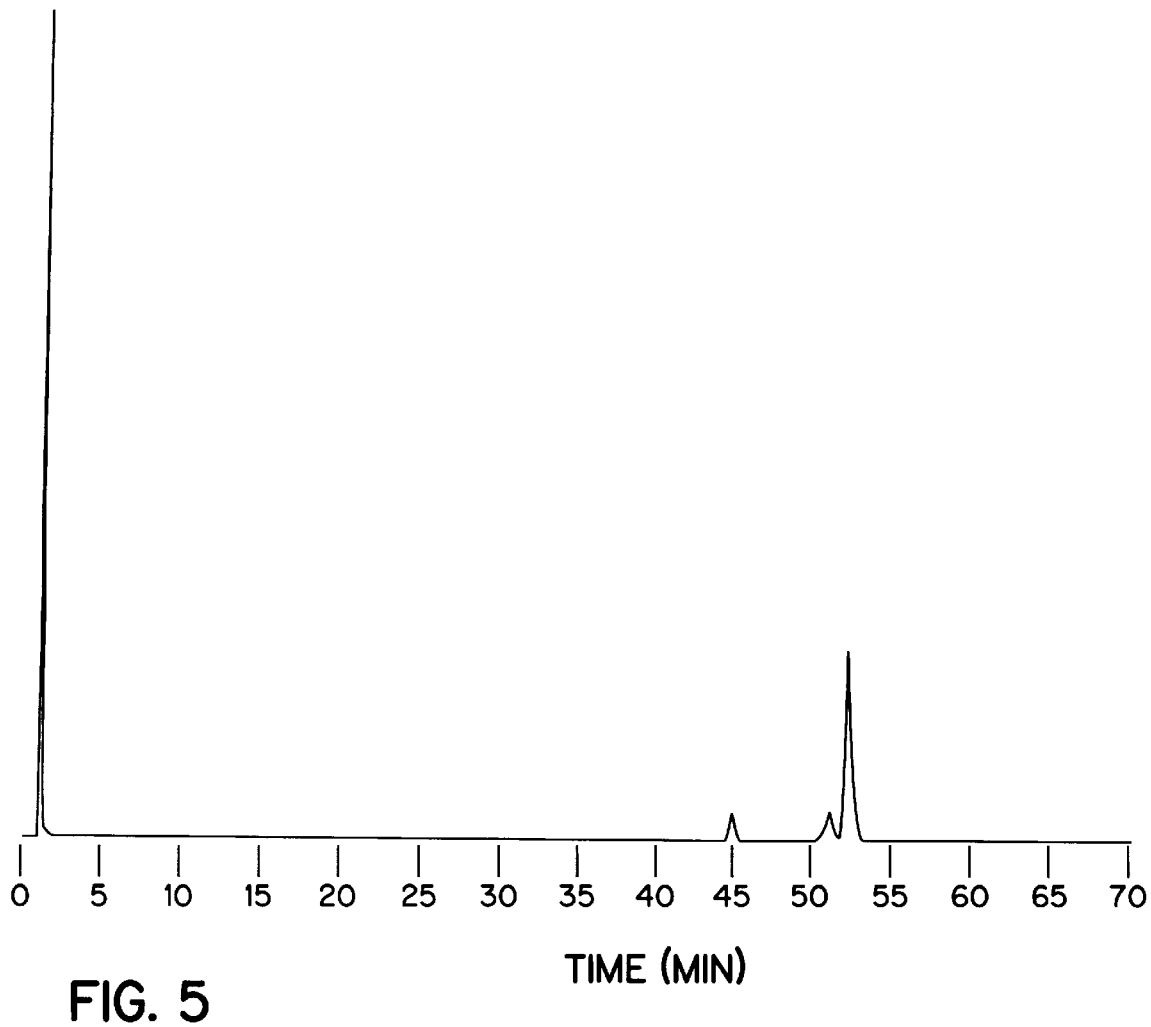
FIG. 5 shows a chromatogram of epoxydecenal synthesized using an (R,R) catalyst and separated by GC using a chiral column.

With reference to FIG. 5, GC separation is shown using a chiral column to which the isomer synthesized using the (R,R) catalyst was applied. The major peak, having a relative concentration of 80.697%, had a retention time of 51.850 min. This closely corresponded to the second peak in FIG. 2 which had a retention time of 51.923 min. Thus, the second peak in FIG. 2 was tentatively identified as the (−) isomer.

Figure 3:
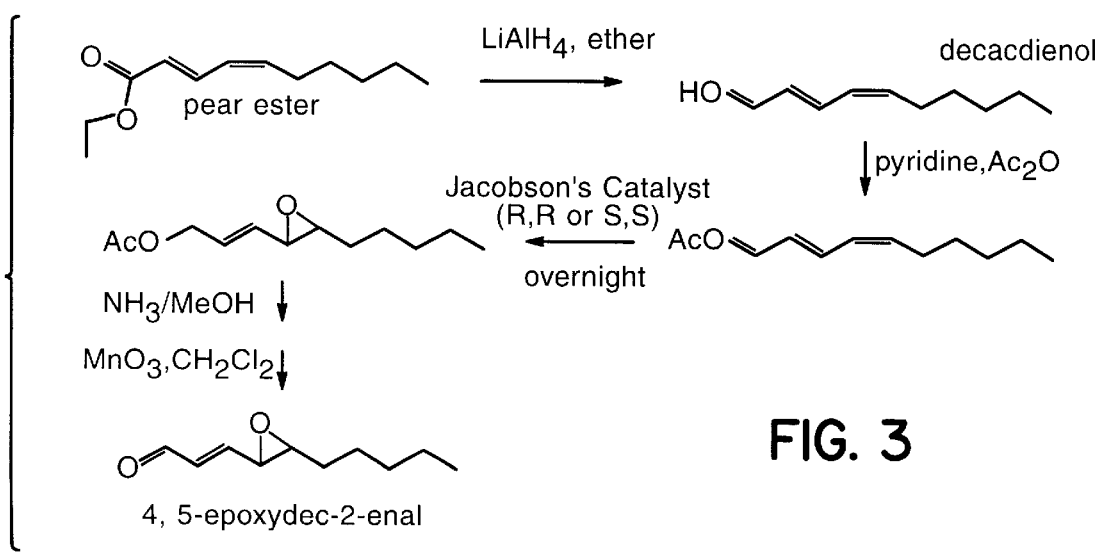
FIG. 3 shows the synthetic scheme for enantiomerically enriched mixtures of epoxydecenal.

The (−) isomer may be diluted in various solvents such as triacetin, ethanol, water, etc., to obtain the desired concentration used in a flavor matrix. Four trained flavor scientists working individually determined that the more intense odor was due to the isomer that had been synthesized as shown in FIG. 3 using the (R,R) catalyst.

Polarimetric measurements, based on the optical activity of a substance, were performed on epoxydecenal syntheized using the (S,S) and (R,R) catalysts to further characterize the isomers. Samples of each isomer (1 ml) were added to a 10 cm quartz cell and were analyzed at 22° C. For epoxydecenal synthesized using the (S,S) catalyst, a 13.65 mg sample was dissolved in methyltertbutyl ether (MTBE) to a concentration of 0.68 units. For epoxydecenal synthesized using the (R,R) catalyst, a 17.16 mg sample was dissolved in MTBE to a concentration of 0.86 units. The results are as follows.

For the (S,S) isomer, the optical rotation $[\alpha]^{22}_D$ was +31.6°. For the (−) isomer, the optical rotation $[\alpha]^{22}_D$ was −31.6°. The same extent of optical rotation in different directions indicated that there was about the same amount of the (−) isomer in one fraction as there was the (+) isomer in the other fraction.

A substantially pure (R,R) isomer of trans-4,5-epoxy-(E)-2-decenal is defined as one that is enriched to have at least about 90% of the (−) form, with the remainder being the (+) form. However, purity of greater than 90% may be obtained; for example, there may be up to about 99% enrichment of the (−) isomer. The mixture may contain 10–25% of cis-4,5-epoxy-(E)-2-decenal.

It should be understood that the embodiments of the present invention shown and described in the specification are only preferred embodiments of the inventor who is skilled in the art and are not limiting in any way. Therefore, various changes, modifications or alterations to these embodiments may be made or resorted to without departing from the spirit of the invention and the scope of the following claims.

What is claimed is:

1. A process for enhancing the flavor of products comprising adding a flavor enhancing amount of epoxydecenal (trans-4,5-epoxy-(E)-2-decenal) that has been enriched to contain a substantially pure (−) isomer of trans-4,5-epoxy-(E)-2-decenal.

2. The process of claim 1 wherein said flavor enhancing amount in the range of about 0.001 ppb to 10 ppm.

3. The process of claim 1 wherein trans-4,5-epoxy-(E)-2-decenal is enriched to contain at least about 90% of said substantially pure (−) isomer.

4. The process of claim 1 wherein trans-4,5-epoxy-(E)-2-decenal is enriched to contain at least about 99% of said substantially pure (−) isomer.

5. The process of claim 1 wherein said product is a foodstuff.

6. The process of claim 1 wherein said isomer is added as a neat solution.

7. The process of claim 1 wherein said isomer is added in a solvent.

8. The process of claim 1 wherein said isomer is added in a dry form.

9. The process of claim 1 wherein said isomer is added in an encapsulated form.

10. A product containing a flavor enhancing amount of trans-4,5-epoxy-(E)-2-decenal that has been enriched to contain a substantially pure (−) isomer of trans-4,5-epoxy-(E)-2-decenal.

11. The product of claim 10 wherein said flavor enhancing amount is about 0.001 ppb to 10 ppm.

12. The product of claim 10 wherein said trans-4,5-epoxy-(E)-2-decenal is enriched to contain at least about 90% of said substantially pure (−) isomer.

13. The product of claim 10 wherein said trans-4,5-epoxy-(E)-2-decenal is enriched to contain at least about 99% of said substantially pure (−) isomer.

14. The product of claim 9 wherein said product is a foodstuff.

15. A substantially pure (−) isomer of trans-4,5-epoxy-(E)-2-decenal with an optical rotation $[\alpha]^{22}_D$ of −31.6°.

* * * * *